(12) United States Patent
Neighbour et al.

(10) Patent No.: US 12,541,578 B2
(45) Date of Patent: *Feb. 3, 2026

(54) COMPUTER-BASED SYSTEMS FOR HIDING AND/OR REVEALING A PASSWORD REVEAL SELECTOR OF A PASSWORD ENTRY USER INTERFACE ELEMENT; AND METHODS OF USE THEREOF

(71) Applicant: Capital One Services, LLC, McLean, VA (US)

(72) Inventors: Erik Neighbour, Arlington, VA (US); Jason Pribble, McLean, VA (US); Maneill Parekh, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 259 days.

This patent is subject to a terminal disclaimer.

(21) Appl. No.: 18/364,190

(22) Filed: Aug. 2, 2023

(65) Prior Publication Data
US 2025/0045365 A1 Feb. 6, 2025

(51) Int. Cl.
*G06F 21/00* (2013.01)
*G06F 21/31* (2013.01)

(52) U.S. Cl.
CPC ...... *G06F 21/31* (2013.01); *G06F 2221/2137* (2013.01)

(58) Field of Classification Search
CPC .................. G06F 21/31; G06F 2221/2137
See application file for complete search history.

(56) References Cited

U.S. PATENT DOCUMENTS

| | | |
|---|---|---|
| 9,588,595 B2 | 3/2017 | Demopoulos et al. |
| 10,354,097 B2 | 7/2019 | Grigoriev et al. |

(Continued)

FOREIGN PATENT DOCUMENTS

| | | |
|---|---|---|
| CA | 2464449 A1 | 10/2004 |
| CN | 102945336 A | 2/2013 |
| KR | 20020086816 A | 11/2002 |

OTHER PUBLICATIONS

International Search Report and Written Opinion from International Application No. PCT/US2024/040588 dated Oct. 7, 2024.

*Primary Examiner* — Joseph P Hirl
*Assistant Examiner* — Chi D Nguy
(74) *Attorney, Agent, or Firm* — Greenberg Traurig, LLP

(57) ABSTRACT

A computer-implemented method including instructing a computing device to display a password entry element configured for input of a plurality of password characters, the password entry element including a password reveal selector, the password reveal selector being operable to be toggled between a first state in which the plurality of password characters are obfuscated and a second state in which the plurality of password characters are revealed; receiving an entry of a password character of the plurality of password characters in the password entry element, instructing the password entry element to display the password reveal selector; detecting a speed at which each character of the plurality of password characters is entered into the password entry element; instructing the password entry element to hide the password reveal selector if a total speed at which each character of the plurality of password characters is entered is less than a predetermined threshold speed.

20 Claims, 11 Drawing Sheets

(56) References Cited

U.S. PATENT DOCUMENTS

| | | | |
|---|---|---|---|
| 2013/0067385 A1* | 3/2013 | Demopoulos | G06F 3/0233 715/780 |
| 2014/0068503 A1* | 3/2014 | Yoon | G06F 3/04842 715/790 |
| 2014/0129974 A1* | 5/2014 | Ben-Harrush | G06F 3/0488 715/781 |
| 2020/0082130 A1 | 3/2020 | Li et al. | |
| 2021/0150050 A1 | 5/2021 | Fu et al. | |
| 2022/0107997 A1* | 4/2022 | Sethi | G06F 21/54 |
| 2024/0193239 A1* | 6/2024 | Candelore | G06F 21/316 |

\* cited by examiner

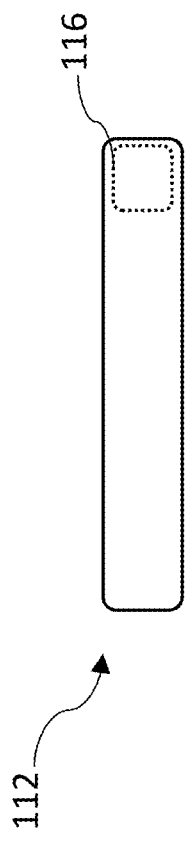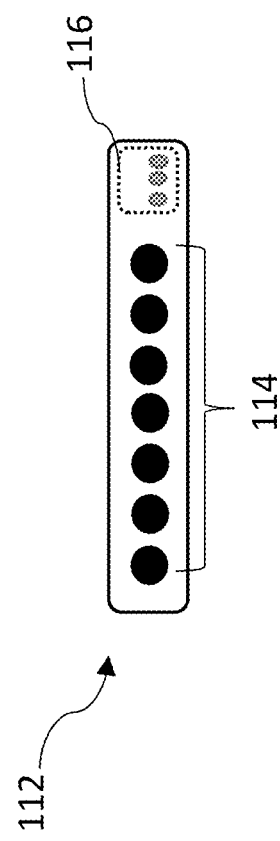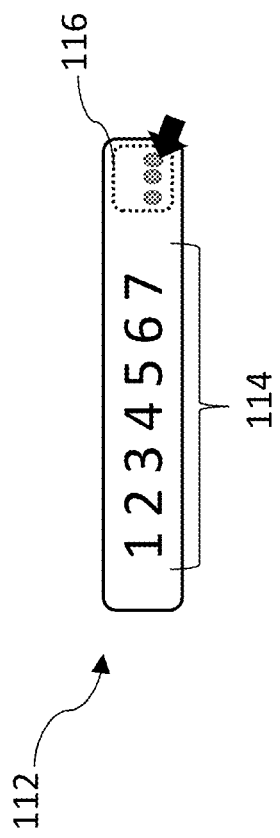

COMPUTER-BASED SYSTEMS FOR HIDING AND/OR REVEALING A PASSWORD REVEAL SELECTOR OF A PASSWORD ENTRY USER INTERFACE ELEMENT; AND METHODS OF USE THEREOF

TECHNICAL FIELD

The present disclosure generally relates to computer-based methods and systems for hiding and/or revealing a password reveal selector of a password entry user interface element.

BACKGROUND

Portable computing devices, such as mobile phones, portable and tablet computers, entertainment devices, handheld navigation devices, and the like are commonly implemented with a touch-screen display designed for user touch-input of text characters and passwords, such as in text entry boxes in a user interface form, page, or document. Text editing controls allow a user to input text characters into a text box, such as on a touch-screen, or with a keyboard, mouse, or similar input device. A device user may enter a password into a text box, such as in a user interface page, and the password characters are obfuscated so as not to reveal the password as the user enters it.

SUMMARY

In some embodiments, the present disclosure provides an exemplary technically improved computer-based method that includes instructing, by one or more processors, a display screen of a computing device to display a password entry user interface (UI) element configured for input of a plurality of password characters of a password, where the password entry UI element includes a user-selectable password reveal selector, where the password reveal selector is operable to be toggled between a first state in which the plurality of password characters are obfuscated and a second state in which the plurality of password characters are revealed; receiving, by one or more processors, an entry of at least one password character of the plurality of password characters in the password entry UI element, where the entry of the at least one password character of the plurality of password characters is obfuscated while displayed in the password entry UI element; instructing, by the one or more processors, the password entry UI element to display the password reveal selector; detecting, by the one or more processors, a speed at which each character of the at least one password character of the plurality of password characters is entered into the password entry UI element; instructing, by the one or more processors, the password entry UI element to hide the password reveal selector if a total speed at which each character the at least one password character of the plurality of password characters is entered is less than a predetermined threshold speed.

In some embodiments, the present disclosure provides an exemplary technically improved computer-based method that includes instructing, by one or more processors, a display screen of a computing device to display a password entry user interface (UI) element configured for input of a plurality of password characters of a password, where the password entry UI element includes a user-selectable password reveal selector, where the password reveal selector is operable to be toggled between a first state in which the plurality of password characters are obfuscated and a second state in which the plurality of password characters are revealed; receiving, by one or more processors, an entry of at least one password character of the plurality of password characters in the password entry UI element, where the entry of the at least one password character of the plurality of password characters is obfuscated while displayed in the password entry UI element; instructing, by the one or more processors, the password entry UI element to display the password reveal selector; detecting, by the one or more processors, a time at which each character of the at least one password character of the plurality of password characters is entered into the password entry UI element; and instructing, by the one or more processors, the password entry UI element to hide the password reveal selector if a duration between a first time at which a first character of the at least one password character of the plurality of password characters and a second time at which a last character of the at least one password character of the plurality of password characters is less than a predetermined threshold duration.

In some embodiments, the present disclosure provides an exemplary technically improved computer-based system that includes instructing, by one or more processors, a display screen of a computing device to display a password entry user interface (UI) element configured for input of a plurality of password characters of a password, where the password entry UI element includes a user-selectable password reveal selector, where the password reveal selector is operable to be toggled between a first state in which the plurality of password characters are obfuscated and a second state in which the plurality of password characters are revealed; receiving, by one or more processors, an entry of at least one password character of the plurality of password characters in the password entry UI element, where the entry of the at least one password character of the plurality of password characters is obfuscated while displayed in the password entry UI element; instructing, by the one or more processors, the password entry UI element to display the password reveal selector; detecting, by the one or more processors, a screen recording of the display screen; and instructing, by the one or more processors, the password entry UI element to hide the password reveal selector upon detection of the screen recording.

BRIEF DESCRIPTION OF THE DRAWINGS

Various embodiments of the present disclosure may be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 2A is a block diagram illustrating an exemplary password entry user interface element and password reveal selector, according to one or more embodiments of the present disclosure.

FIG. 2B is a block diagram illustrating an exemplary password entry user interface element and password reveal selector, according to one or more embodiments of the present disclosure.

FIG. 2C is a block diagram illustrating an exemplary password entry user interface element and password reveal selector, according to one or more embodiments of the present disclosure.

DETAILED DESCRIPTION

Figure 1:
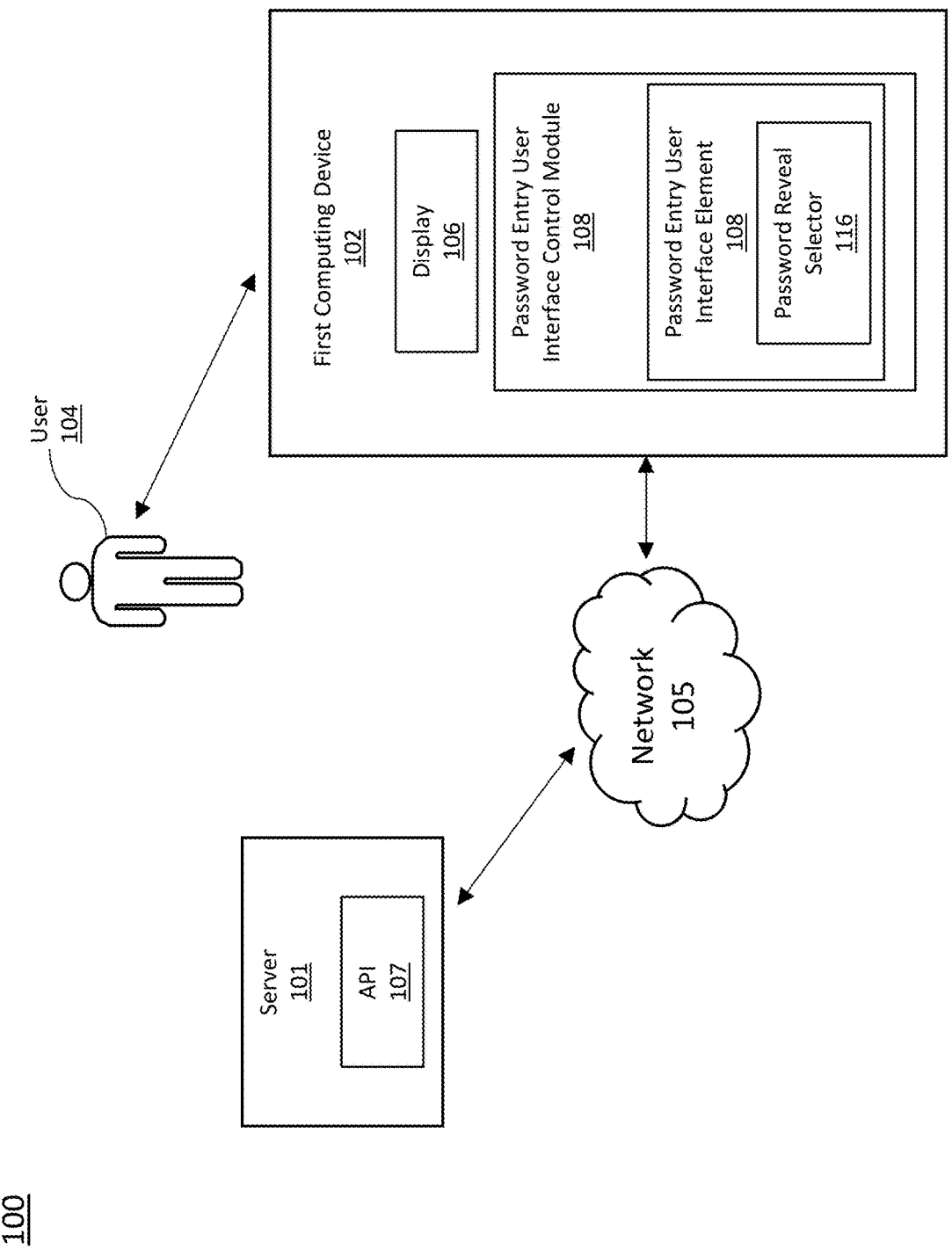
FIG. 1 is a block diagram illustrating an exemplary computer-based system for hiding/showing a password reveal selector of a password entry user interface element, according to one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

As used herein, the term "customer", "client" or "user" shall have a meaning of at least one customer or at least one user respectively.

As used herein, the term "mobile computing device", "user device" or the like, may refer to any portable electronic device that may include relevant software and hardware. For example, a "mobile computing device" can include, but is not limited to, any electronic computing device that is able to among other things receive and process alerts from a customer or a financial entity including, but not limited to, a mobile phone, smart phone, or any other reasonable mobile electronic device that may or may not be enabled with a software application (App) from the customer's financial entity.

As used herein, the term "user" shall have a meaning of at least one user. In some embodiments, the terms "user", "subscriber" "consumer" or "customer" should be understood to refer to a user of an application or applications as described herein, and/or a consumer of data supplied by a data provider. By way of example, and not limitation, the terms "user" or "subscriber" may refer to a person who receives data provided by the data or service provider over the Internet in a browser session or may refer to an automated software application which receives the data and stores or processes the data.

In some embodiments, a "mobile computing device" or "user device" may include computing devices that typically connect using a wireless communications medium such as cell phones, smart phones, tablets, laptops, computers, pagers, radio frequency (RF) devices, infrared (IR) devices, CBs, integrated devices combining one or more of the preceding devices, or virtually any mobile computing device that may use an application, software or functionality to receive and process alerts, credit offers, credit requests, and credit terms from a customer or financial institution.

As used herein, the term "application programming interface" or "API" refers to a computing interface that defines interactions between multiple software intermediaries. An "application programming interface" or "API" defines the kinds of calls or requests that can be made, how to make the calls, the data formats that should be used, the conventions to follow, among other requirements and constraints. An "application programming interface" or "API" can be entirely custom, specific to a component, or designed based on an industry-standard to ensure interoperability to enable modular programming through information hiding, allowing users to use the interface independently of the implementation.

To help customers accurately type in their password, websites and apps commonly have a password reveal selector (i.e., a password hide/show button) that allows a user to see the password when the user is typing in plaintext. Viewing the typed password may assist the user in confirming that the password is typed in accurately prior to submitting for validation. However, there are security risks associated with a password reveal selector. One major risk is associated with password storing software or applications, often called password managers, which store login information, including passwords. For example, if a fraudulent actor looking to steal a password has access to a user's device, the fraudulent actor may simply go to the target website, let the password manager auto-populate the password, and then toggle the password reveal selector to see the password in plain text. Thus, anyone at anytime can unmask a supposedly "hidden" password. Another risk is shoulder surfing; the risk that someone else views a user's password as the user is typing it in.

FIGS. 1 through 11 illustrate systems and methods for hiding and/or revealing a password reveal selector of a password entry user interface element, in accordance with at least some embodiments of the present disclosure. In some embodiments, the system may be configured to hide and/or show the password reveal selector based on various password reveal selector conditions. In some embodiments, the password reveal selector conditions may be time-based or based on manipulation of a display of a user computing device. The following embodiments provide technical solutions and technical improvements that overcome technical problems, drawbacks and/or deficiencies in at least one technical field involving securely entering a password. As explained in more detail below, the present disclosure provides a technically advantageous computer architecture that improves security when entering a password by providing conditions which must be met before a password may be displayed.

FIG. 1 is a block diagram illustration of an exemplary system 100 used to implement one or more embodiments of the present disclosure. The components and arrangements shown in FIG. 1 are not intended to limit the disclosed embodiments as the components used to implement the disclosed processes and features may vary. In accordance with disclosed implementations, the system 100 may include a server 101 in communication with a first computing device 102 associated with a user 104 via a network 105. In some embodiments, the first computing device 102 includes a display 106 (e.g, a display screen) and a password entry user interface (UI) control module 108, as will be described in further detail below.

Network 105 may be of any suitable type, including individual connections via the internet such as cellular or Wi-Fi networks. In some embodiments, network 105 may connect participating devices using direct connections such as radio-frequency identification (RFID), near-field communication (NFC), Bluetooth™, low-energy Bluetooth™ (BLE), Wi-Fi™, ZigBee™ ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Server 101 may be associated with an entity. In some embodiments, the entity may be a financial institution. For example, server 101 may manage individual user accounts or process financial transactions. In some embodiments, the server 101 may include one or more logically or physically distinct systems. In some embodiments, the server 101 may provide a service through an API 107 of the server 101. This service provided through API 130 also may be referred to as an API service.

In some embodiments, the server 101 may, for example, be a computer system or be implemented by a computer system. As mentioned above, the server 101 may offer a service through the API 107. For example, in some embodiments, the server 101 may provide data or information in response to a request received by the server 101 through the API 107. Such requests may be referred to as API calls or API requests. In some embodiments, the data or information provided by the server 101 may be stored in a memory, database, or other data storage that is part of the server 101, and may be retrieved by the server 101 in response to the request. However, in some embodiments, it is also possible for the data or information provided by the server 101, or portions thereof, to be stored at a location external to the server, in which case the server 101 may first retrieve the data or information from another source before providing the data or information to the requesting party. In some embodiments, the API 107 may, for example, be a representational state transfer (REST) or simple object access protocol (SOAP) API, and return information in JSON, HTML, plain text or XML format. In some embodiments, the server 101 may be a web server or an application server.

In some embodiments, the server 101 may include hardware components such as a processor (not shown), which may execute instructions that may reside in local memory and/or be transmitted remotely. In some embodiments, the processor may include any type of data processing capacity, such as a hardware logic circuit, for example, an application specific integrated circuit (ASIC) and a programmable logic, or such as a computing device, for example a microcomputer or microcontroller that includes a programmable microprocessor.

In some embodiments, the first computing device 102 may be associated with the user 104. In some embodiments, the first computing device 102 may generally include at least computer-readable non-transient medium, a processing component, an Input/Output (I/O) subsystem and wireless circuitry. In some embodiments, these components may be coupled by one or more communication buses or signal lines. In some embodiments, the first computing device 102 may include a microprocessor, a memory, a contactless communication interface having a communication field and the display 106. The first computing device 102 may also include means for receiving user input, such as a keypad, touch screen, voice command recognition, a stylus, and other input/output devices, and the display 106 may be any type of display screen, including an LCD or LED display. In some embodiments, the first computing device 102 may be, without limitations, a desktop computer, a laptop computer, a tablet, a mobile phone or portable device, or any other computing hardware.

In some embodiments, the first computing device 102 may have data connectivity to a network, such as the Internet, via a wireless communication network, a cellular network, a wide area network, a local area network, a wireless personal area network, a wide body area network, or the like, or any combination thereof. In some embodiments, through this connectivity, the first computing device 102 may communicate with a server 101.

In some embodiments, the computing device includes the password entry UI module 108 which can be implemented as computer-executable instructions, such as a software application or module that is executed by one or more processors to implement the various embodiments described herein. In some embodiments, the password entry UI module 108 may include a password entry UI element 112 for display on the display 106 of a computing device 102. In some embodiments, the password entry UI element 112 may be implemented as any type of text entry user interface, password entry box, or form control that is instantiated in a user interface, such as a form, HTML page, or document to facilitate user input of a plurality of password characters 114 of a password (e.g., letters, numbers, and/or other alphanumeric characters). In some embodiments, the password entry UI element 112 may include a password reveal selector 116 that may be incorporated as part of the password entry UI element 112 and bound to the password entry UI element 112 when instantiated in a user interface, such as in a form, page, or document that includes password entry UI element 112 for a plurality of password characters 114.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

FIGS. 2A-2C illustrates examples of a password entry UI element 112 that includes a password reveal selector 116, which may be implemented by the computing device 102 and the various components described with reference to FIG. 1. For example, in some embodiments, a user interface, such as a form or HTML page, may include a password entry UI element 112 in which the user 104 may enter the plurality of password characters 114 of a password.

As depicted at FIG. 2A, in some embodiments, the password entry UI element 112 includes a password reveal selector 116 implemented for user-selection to reveal the password that may be displayed in the password entry UI element 112. In some embodiments, the password reveal selector 116 may be initially concealed from view when the password entry UI element 112 is displayed. In FIG. 2A, the dashed outline of the password entry UI element 112 is shown merely to illustrate that the password entry UI element 112 may be implemented to include the password reveal selector 116. In practice, in some embodiments, the password reveal selector 116 may be concealed from view and not visible to the user.

As depicted in FIG. 2B, in some embodiments, the plurality of password characters 114 may initially be obfuscated in the password entry UI element 112 to conceal the password from view and preclude others from obtaining the password from the user. In some embodiments, the password reveal selector 116 of the password entry UI element 112 may be implemented for user-selection to reveal the password in the password entry UI element 112. In some embodiments, the password reveal selector may be toggled between a first state in which the plurality of password characters 114 are obfuscated and a second state in which the plurality of password characters 114 are revealed. For example, in some embodiments, the user 104 may select the password reveal selector 116 as shown at FIG. 2C to initiate revealing the plurality of password characters 114 in the password entry UI element 112. In some embodiments, the user 104 may select the password reveal selector 116 by holding down a mouse button, with a keyboard shortcut, or other user-selectable mechanism. In implementations, the password entry UI control module 108 of the computing device 102 may initiate revealing the password (e.g., displaying the plurality of password characters 114) in the password entry UI element 112 when a user-selection of the password reveal selector 116 is received. In some embodiments, when the user 104 selects the password reveal selector 116, the plurality of password characters 114 may be revealed in the password entry UI element 112 for as long as the user-selection of the password reveal selector 116 is received (e.g., for as long as the user 104 maintains the selection).

In the embodiment of FIGS. 2A-2C, the password reveal selector 116 is shown positioned on the right side of the password entry UI element 112. However, in some embodiments, the password reveal selector 116 may be positioned in any other position associated with the password entry UI element 112 to accommodate viewing the password. In some embodiments, the position of the password reveal selector 116 relative to the password entry UI element 112 may be user-configurable, such as for a left-handed user who may prefer the password reveal selector positioned on the left side of the password entry UI element 112.

In some embodiments, the password reveal selector 116 of the password entry UI element 112 may be displayed based on a password reveal selector condition. For example, in some embodiments, the password reveal selector condition may be a time-based condition, as will be described in further detail below. In some embodiments, the password reveal selector condition may be based on user manipulation of the computing device 102 or the display 106, as will be described in further detail below.

In some embodiments, the password reveal selector 116 may be hidden by the password entry UI element 112 based on the user 104 being inactive for a period of time that exceeds a predetermined threshold duration. For example, in some embodiments, the password entry UI element 112 may hide the password reveal selector 116 if a time between entry of a first character of the plurality of password characters 114 and entry of a second character of the plurality of password characters 114 exceeds, for example, 30 seconds. In some embodiments, the predetermined threshold of inactivity may be applied to entry of any two consecutive characters of the plurality of password characters 114, not just the first character and the second character. For example, if the user 104 is inactive between entry of a fourth character and entry of a fifth character of the plurality of password characters 114 for longer than the predetermined threshold of time, the password reveal selector 116 may be hidden.

In some embodiments, the password reveal selector 116 may be hidden after 5 seconds to 30 seconds of visibility. In some embodiments, the password reveal selector 116 may be hidden after 10 seconds to 30 seconds of visibility. In some embodiments, the password reveal selector 116 may be hidden after 15 seconds to 30 seconds of visibility. In some embodiments, the password reveal selector 116 may be hidden after 20 seconds to 30 seconds of visibility. In some embodiments, the password reveal selector 116 may be hidden after 25 seconds to 30 seconds of visibility.

In some embodiments, the password reveal selector 116 may be hidden after 5 seconds to 25 seconds of visibility. In some embodiments, the password reveal selector 116 may be hidden after 5 seconds to 20 seconds of visibility. In some embodiments, the password reveal selector 116 may be hidden after 5 seconds to 15 seconds of visibility. In some embodiments, the password reveal selector 116 may be hidden after 5 seconds to 10 seconds of visibility.

In some embodiments, the password reveal selector 116 may be hidden after 10 seconds to 25 seconds of visibility. In some embodiments, the password reveal selector 116 may be hidden after 10 seconds to 20 seconds of visibility. In some embodiments, the password reveal selector 116 may be hidden after 10 seconds to 15 seconds of visibility. In some embodiments, the password reveal selector 116 may be hidden after 15 seconds to 25 seconds of visibility. In some embodiments, the password reveal selector 116 may be hidden after 15 seconds to 20 seconds of visibility. In some embodiments, the password reveal selector 116 may be hidden after 20 seconds to 25 seconds of visibility.

In some embodiments, the password reveal selector 116 may automatically revert to hidden after a predetermined threshold time of visibility. For example, in some embodiments, the password reveal selector 116, when selected by the user 104, may reveal the plurality of password characters 114 for the predetermined threshold duration. Once the predetermined threshold of time has lapsed, the password reveal selector 116 may be automatically hidden by the password entry UI element 112.

In some embodiments, the password reveal selector 116 may be hidden after 5 seconds to 30 seconds of visibility. In some embodiments, the password reveal selector 116 may be hidden after 10 seconds to 30 seconds of visibility. In some embodiments, the password reveal selector 116 may be hidden after 15 seconds to 30 seconds of visibility. In some embodiments, the password reveal selector 116 may be hidden after 20 seconds to 30 seconds of visibility. In some embodiments, the password reveal selector 116 may be hidden after 25 seconds to 30 seconds of visibility.

In some embodiments, the password reveal selector 116 may be hidden after 5 seconds to 25 seconds of visibility. In some embodiments, the password reveal selector 116 may be hidden after 5 seconds to 20 seconds of visibility. In some embodiments, the password reveal selector 116 may be hidden after 5 seconds to 15 seconds of visibility. In some embodiments, the password reveal selector 116 may be hidden after 5 seconds to 10 seconds of visibility.

In some embodiments, the password reveal selector 116 may be hidden after 10 seconds to 25 seconds of visibility. In some embodiments, the password reveal selector 116 may be hidden after 10 seconds to 20 seconds of visibility. In some embodiments, the password reveal selector 116 may be hidden after 10 seconds to 15 seconds of visibility. In some embodiments, the password reveal selector 116 may be hidden after 15 seconds to 25 seconds of visibility. In some embodiments, the password reveal selector 116 may be hidden after 15 seconds to 20 seconds of visibility. In some embodiments, the password reveal selector 116 may be hidden after 20 seconds to 25 seconds of visibility.

In some embodiments, the password reveal selector 116 may be hidden if a paste event is detected by the computing device 102. For example, in some instances, computing devices may include a password-saving software, or password manager, that saves the user's passwords for various websites, applications, etc. Sometimes, the password-saving software may automatically suggest or input the same password, or the most used saved password for those previously visited websites and applications, as well as any new websites or applications which require a password. Thus, a fraudulent actor may be able to use this password-saving software to fraudulently obtain the user's passwords. Accordingly, in some embodiments, the password entry UI control module 108 may automatically hide the password reveal selector 116 if such a paste event is detected so as to prevent a fraudulent actor from seeing the saved password. In some embodiments, a paste event is detected by detecting a speed at which each character of the plurality of password characters 114 is entered into the password entry UI element 112. In some embodiments, if a total speed at which the plurality of password characters 114 is entered is faster than a pre-determined threshold speed, the password reveal selector 116 may be hidden by the password entry UI control module 108.

In some embodiments, the predetermined threshold speed is from 0.05 seconds to 0.5 seconds. In some embodiments, the predetermined threshold speed is from 0.1 seconds to 0.5 seconds. In some embodiments, the predetermined threshold speed is from 0.2 seconds to 0.5 seconds. In some embodiments, the predetermined threshold speed is from 0.3 seconds to 0.5 seconds. In some embodiments, the predetermined threshold speed is from 0.4 seconds to 0.5 seconds.

In some embodiments, the predetermined threshold speed is from 0.05 seconds to 0.4 seconds. In some embodiments, the predetermined threshold speed is from 0.05 seconds to 0.3 seconds. In some embodiments, the predetermined threshold speed is from 0.05 seconds to 0.2 seconds. In some embodiments, the predetermined threshold speed is from 0.05 seconds to 0.1 seconds.

In some embodiments, the predetermined threshold speed is from 0.1 seconds to 0.4 seconds. In some embodiments, the predetermined threshold speed is from 0.2 seconds to 0.3 seconds. In some embodiments, the predetermined threshold speed is from 0.1 seconds to 0.2 seconds. In some embodiments, the predetermined threshold speed is from 0.3 seconds to 0.4 seconds.

In some embodiments, after the paste event is detected and the password reveal selector 116 may be hidden, if the plurality of password characters 114 pasted into the password entry UI element 112 are subsequently completely cleared out from the password entry UI element 112, the password reveal selector 116 may be changed from hidden to visible by the password entry UI control module 108. That is, because the threat of a fraudulent user seeing the pasted password is removed when the password is completely cleared from the password entry UI element 112, the password reveal selector 116 may be again shown and used for further password character input.

In some embodiments, the password reveal selector 116 may be hidden if a duration between a first time at which a first character of the plurality of password characters 114 and a second time at which a last character of the plurality of password characters 114 is less than a pre-determined threshold duration. In some embodiments, this password reveal selector condition may be another method of detecting whether a password was entered by a password manager, in case a paste event cannot be detected. For example, in some embodiments, if the time between entry of the first character and the last character is faster than the user 104 could manually enter a password, based on a minimum password length requirement, then an assumption may be made that the password was automatically pasted into the password entry UI element 112 by a password manager.

In some embodiments, the predetermined threshold speed is from 0.05 seconds to 0.5 seconds. In some embodiments, the predetermined threshold speed is from 0.1 seconds to 0.5 seconds. In some embodiments, the predetermined threshold speed is from 0.2 seconds to 0.5 seconds. In some embodiments, the predetermined threshold speed is from 0.3 seconds to 0.5 seconds. In some embodiments, the predetermined threshold speed is from 0.4 seconds to 0.5 seconds.

In some embodiments, the predetermined threshold speed is from 0.05 seconds to 0.4 seconds. In some embodiments, the predetermined threshold speed is from 0.05 seconds to 0.3 seconds. In some embodiments, the predetermined threshold speed is from 0.05 seconds to 0.2 seconds. In some embodiments, the predetermined threshold speed is from 0.05 seconds to 0.1 seconds.

In some embodiments, the predetermined threshold speed is from 0.1 seconds to 0.4 seconds. In some embodiments, the predetermined threshold speed is from 0.2 seconds to 0.3 seconds. In some embodiments, the predetermined threshold speed is from 0.1 seconds to 0.2 seconds. In some embodiments, the predetermined threshold speed is from 0.3 seconds to 0.4 seconds.

In some embodiments, after the paste event is detected and the password reveal selector 116 is hidden, if the plurality of password characters 114 pasted into the password entry UI element 112 are subsequently completely cleared out from the password entry UI element 112, the password reveal selector 116 may be moved from hidden to visible by the password entry UI control module 108. That is, because the threat of a fraudulent user seeing the pasted password is removed when the password is completely cleared from the password entry UI element 112, the password reveal selector 116 may be again shown and used for further password character input.

In some embodiments, a determination regarding use of a password manager (e.g., a "password manager determination") may be made, by the server 101, that a paste event is or is not associated with a password manager, such as by a user copy and pasting a password from a password manager or by the password manager auto-populating the password entry UI element 112. In some embodiments, the password manager determination may be included in an API request through the API 107 of the server 101, such as by adding a flag (e.g., via a Boolean value or alphanumeric label, or by any other flagging technique or any combination thereof). In some embodiments, the password manager determination may be sent to the server 101 via a same API call as the password or in a separate API call. In some embodiments, the password manager determination may be returned as a Boolean value. In some embodiments, if a password manager is detected, the server 101 may return, via the API 107, to the first computing device 102 additional security challenges to authenticate the user and/or first computing device 102. Thus, where a password manager is used, the user 104 may be prompted to complete additional security challenges after successful login into a user account.

In some embodiments, the password reveal selector 116 may be hidden if a screen recording of the display is detected. For example, in some instances, a fraudulent actor may try to obtain a password using a screen recorder such as, for example, a screen recording software, application, webbrowser extension, etc. If a fraudulent actor implements a screen recorder, the user 104 may enter the plurality of password characters 114 and, without realizing that the screen is being recorded, reveal the password using the password reveal selector 116. Thus, hiding the password reveal selector 116 during a screen recording prevents the user 104 from inadvertently revealing the password characters.

Figure 3:
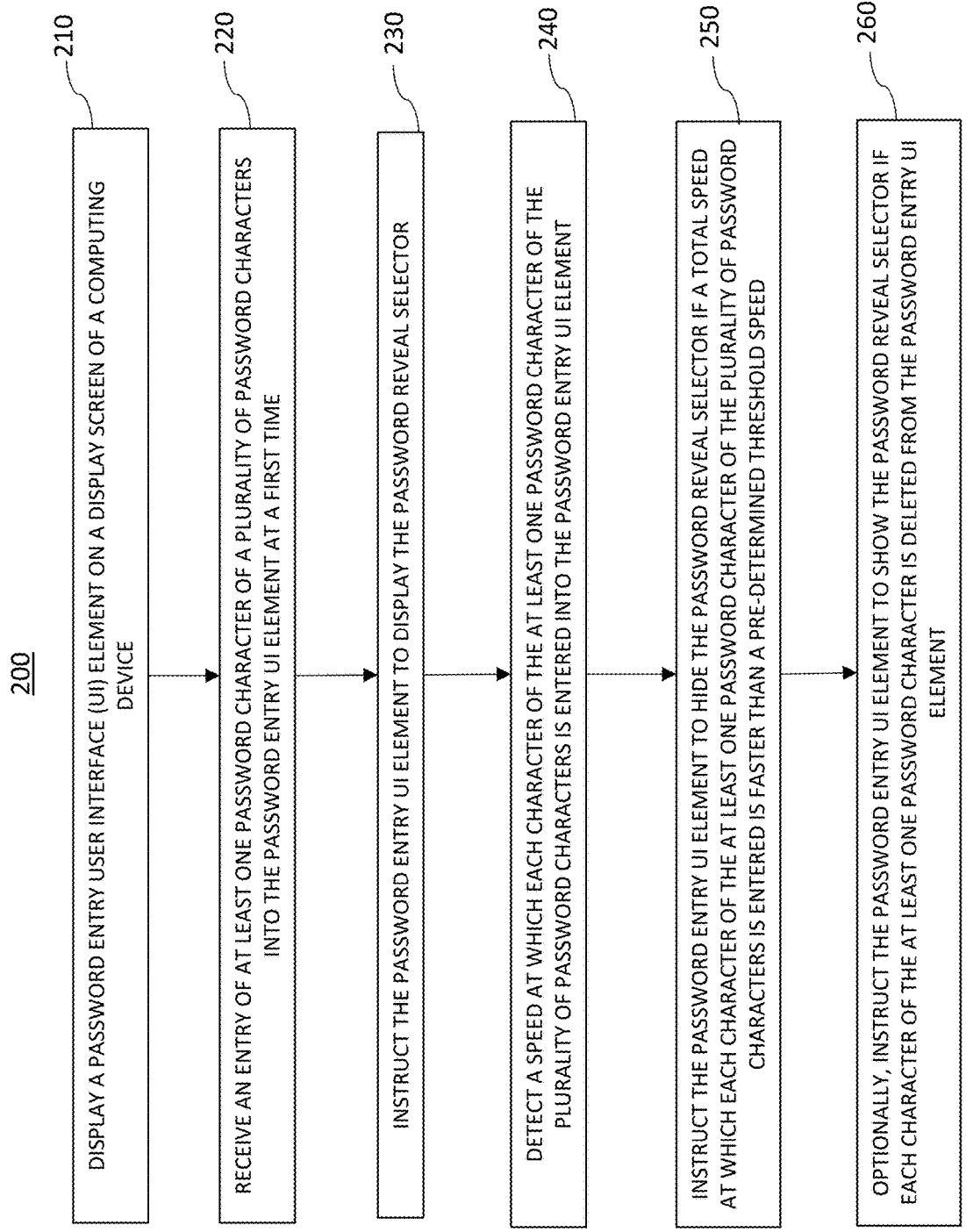
FIG. 3 is a process flow diagram illustrating an example of a computer-based process for hiding/showing a password reveal selector of a password entry user interface element, according to one or more embodiments of the present disclosure.

FIG. 3 is a process flow diagram illustration of an example of an illustrated computer-mediated process for hiding and/or displaying a password reveal selector, according to one or more embodiments of the present disclosure. The exemplary computer-mediated process 200 may be executed by software, hardware, or a combination thereof. For example, process 200 may be performed by including one or more components described in the system 100 of FIG. 1 (e.g., first computing device 102). The order in which the method steps are described are not intended to be construed as a limitation, and any number of the described method steps can be combined in any order to implement a method, or an alternate method.

At step 210, a password entry UI element 112 may be displayed for input of a plurality of password characters 114 of a password, the password entry UI element 112 including a password reveal selector 116 for user-selection to reveal the password. In some embodiments, any of the password entry boxes may be implemented to receive the plurality of password characters 114 by designation of a width parameter that indicates a minimum number of password characters for the password entry UI element 112. In some embodiments, the password reveal selector 116 may be hidden from view until entry of at least one character of the plurality of password characters 114 into the password entry UI element 112. For example, in some embodiments, the password entry UI element 112 may include the password reveal selector 116, which may be initially concealed from view when the password entry UI element 112 is displayed because a password character of the plurality of password characters 114 has not yet been received in the password entry UI element 112. In some embodiments, when at least one password character is received in the password entry UI element 112, the password reveal selector 116 may then be displayed for user-selection to initiate revealing the password.

At step 220, at least one character of the plurality of password characters 114 may be entered into the password entry UI element 112. In some embodiments, the at least one character of the plurality of password characters 114 may be obfuscated when displayed in the password entry UI element 112. For example, in some embodiments, the computing device 102 may receive the character entries for a password from any type of input device, such as a keyboard, mouse, on-screen keyboard, remote control device, game controller, or any other type of user-initiated and/or user-selectable input device. In some embodiments, the plurality of password characters 114 may be obfuscated to conceal the entries from view and preclude others from obtaining the password.

At step 230, as discussed above, the password entry UI control module 108 may instruct the password entry UI element 112 to display the password reveal selector upon entry of the at least one character of the plurality of password characters 114. Although in the exemplary process 300, the password reveal selector 116 is displayed upon entry of the at least one character of the plurality of password characters 114, in some embodiments, the password reveal selector 116 may be displayed prior to entry of any password characters.

At step 240, the password entry UI control module 108 may detect a speed at which each character of the at least one password character of the plurality of password characters 114 is entered into the password entry UI element 112.

At step 250, the password entry UI control module 108 may instruct the password entry UI element 112 to hide the password reveal selector 116 if a total speed at which the at least one password character of the plurality of password characters 114 is entered is faster than a pre-determined threshold speed.

At step 260, optionally, the password entry UI element 112 may show the password reveal selector 116 if each character of the at least one password character is deleted from the password entry UI element 112.

Figure 4:
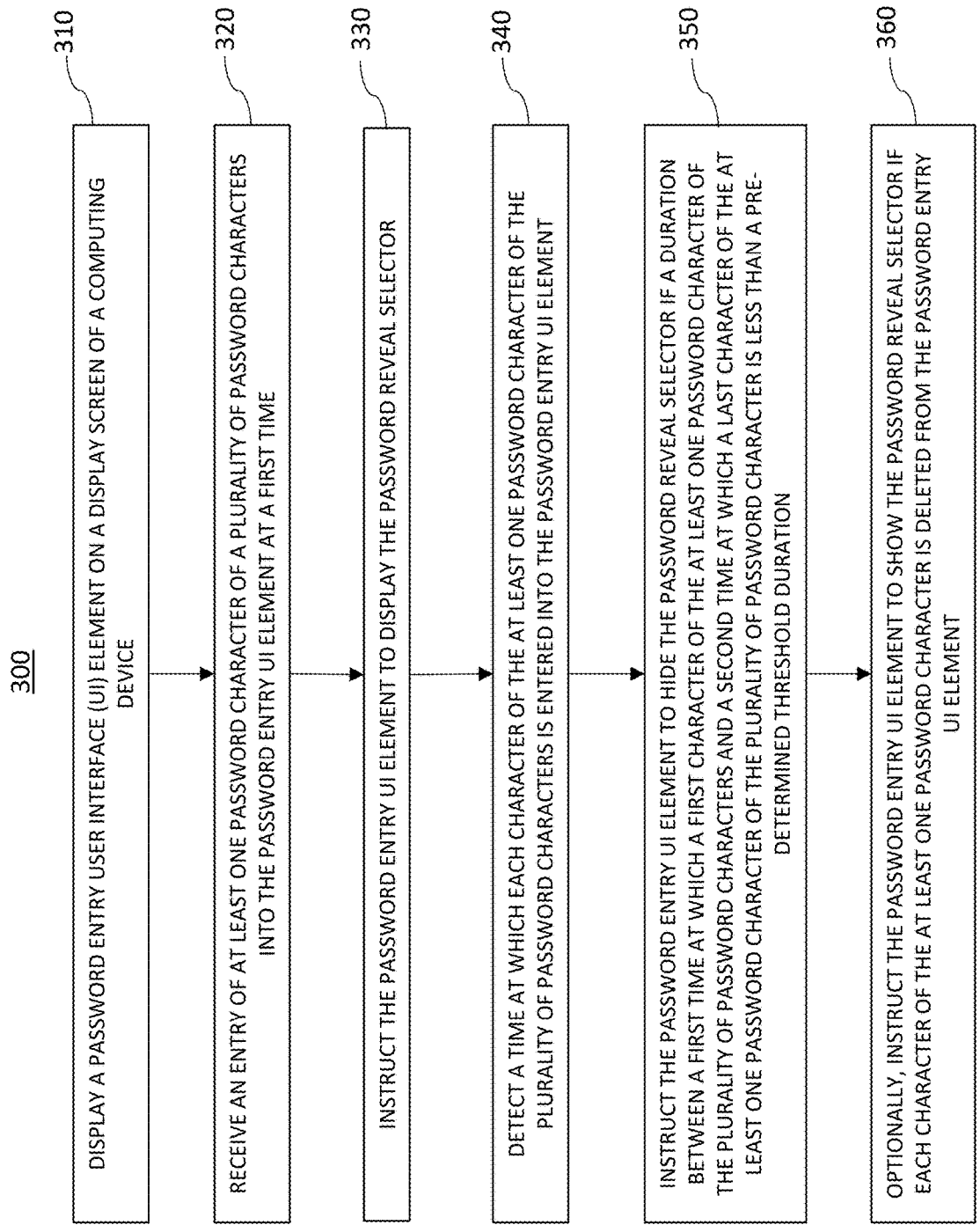
FIG. 4 is a process flow diagram illustrating an example of a computer-based process for hiding/showing a password reveal selector of a password entry user interface element, according to one or more embodiments of the present disclosure.

FIG. 4 is a process flow diagram illustration of an example of an illustrated computer-mediated process for hiding and/or displaying a password reveal selector, according to one or more embodiments of the present disclosure. The exemplary computer-mediated process 300 may be executed by software, hardware, or a combination thereof. For example, process 300 may be performed by including one or more components described in the system 100 of FIG. 1 (e.g., first computing device 102). The order in which the method steps are described are not intended to be construed as a limitation, and any number of the described method steps can be combined in any order to implement a method, or an alternate method.

At step 310, a password entry UI element 112 may be displayed for input of a plurality of password characters 114 of a password, the password entry UI element 112 including a password reveal selector 116 for user-selection to reveal the password. In some embodiments, any of the password entry boxes may be implemented to receive the plurality of password characters 114 by designation of a width parameter that indicates a minimum number of password characters for the password entry UI element 112. In some embodiments, the password reveal selector 116 may be hidden from view until entry of at least one character of the plurality of password characters 114 into the password entry UI element 112. For example, in some embodiments, the password entry UI element 112 may include the password reveal selector 116, which may be initially concealed from view when the password entry UI element 112 is displayed because a password character of the plurality of password characters 114 has not yet been received in the password entry UI element 112. In some embodiments, when at least one password character is received in the password entry UI element 112, the password reveal selector 116 may then be displayed for user-selection to initiate revealing the password.

At step 320, at least one character of the plurality of password characters 114 may be entered into the password entry UI element 112. In some embodiments, the at least one character of the plurality of password characters 114 may be obfuscated when displayed in the password entry UI element 112. For example, in some embodiments, the computing device 102 may receive the character entries for a password from any type of input device, such as a keyboard, mouse, on-screen keyboard, remote control device, game controller, or any other type of user-initiated and/or user-selectable input device. In some embodiments, the plurality of password characters 114 are obfuscated to conceal the entries from view and preclude others from obtaining the password.

At step 330, as discussed above, the password entry UI control module 108 may instruct the password entry UI element 112 to display the password reveal selector 116 upon entry of the at least one character of the plurality of password characters 114. Although in the exemplary process 300, the password reveal selector 116 may be displayed upon entry of the at least one character of the plurality of password characters 114, in some embodiments, the password reveal selector 116 may be displayed prior to entry of any password characters.

At step 340, password entry UI control module 108 may detect a time at which each character of the at least one password character of the plurality of password characters 114 is entered into the password entry UI element 112.

At step 350, the password entry UI control module 108 may instruct the password entry UI element 112 to hide the password reveal selector 116 if a duration between a first time at which a first character of the at least one password character of the plurality of password characters 114 and a second time at which a last character of the at least one password character of the plurality of password characters 114 is less than a pre-determined threshold duration.

At step 360, optionally, the password entry UI element 112 may show the password reveal selector 116 if each character of the at least one password character is deleted from the password entry UI element 112.

Figure 5:
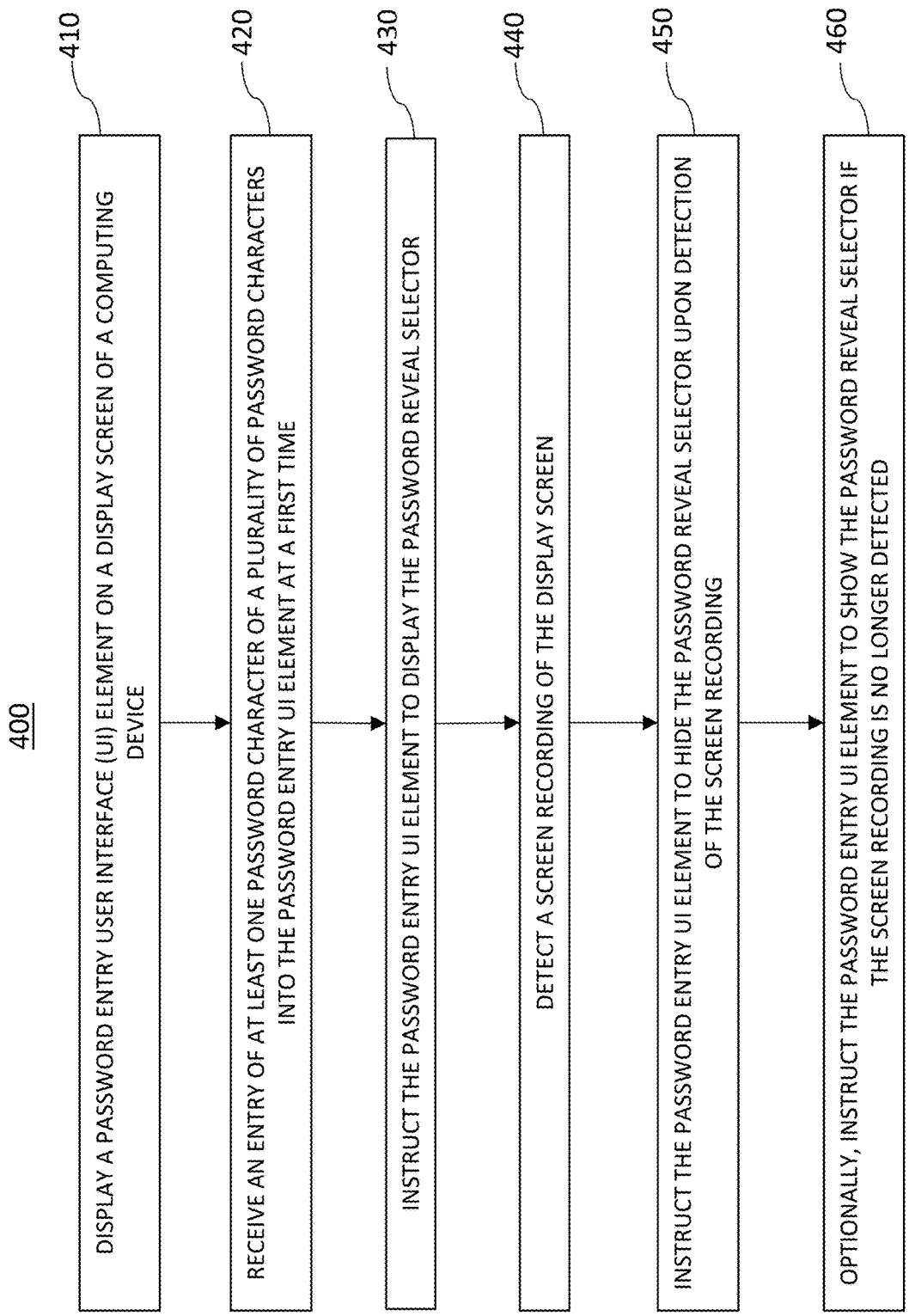
FIG. 5 is a process flow diagram illustrating an example of a computer-based process for hiding/showing a password reveal selector of a password entry user interface element, according to one or more embodiments of the present disclosure.

FIG. 5 is a process flow diagram illustration of an example of an illustrated computer-mediated process for hiding and/or displaying a password reveal selector, according to one or more embodiments of the present disclosure. The exemplary computer-mediated process 400 may be executed by software, hardware, or a combination thereof. For example, process 400 may be performed by including one or more components described in the system 100 of FIG. 1 (e.g., first computing device 102). The order in which the method steps are described are not intended to be construed as a limitation, and any number of the described method steps can be combined in any order to implement a method, or an alternate method.

At step 410, a password entry UI element 112 may be displayed for input of a plurality of password characters 114 of a password, the password entry UI element 112 including a password reveal selector 116 for user-selection to reveal the password. In some embodiments, any of the password entry boxes may be implemented to receive the plurality of password characters 114 by designation of a width parameter that indicates a minimum number of password characters for the password entry UI element 112. In some embodiments, the password reveal selector 116 may be hidden from view until entry of at least one character of the plurality of password characters 114 into the password entry UI element 112. For example, in some embodiments, the password entry UI element 112 may include the password reveal selector 116, which may be initially concealed from view when the password entry UI element 112 is displayed because a password character of the plurality of password characters 114 has not yet been received in the password entry UI element 112. In some embodiments, when at least one password character is received in the password entry UI element 112, the password reveal selector 116 may then be displayed for user-selection to initiate revealing the password.

At step 420, at least one character of the plurality of password characters 114 may be entered into the password entry UI element 112. In some embodiments, the at least one character of the plurality of password characters 114 may be obfuscated when displayed in the password entry UI element 112. For example, in some embodiments, the computing device 102 may receive the character entries for a password from any type of input device, such as a keyboard, mouse, on-screen keyboard, remote control device, game controller, or any other type of user-initiated and/or user-selectable input device. In some embodiments, the plurality of password characters 114 may be obfuscated to conceal the entries from view and preclude others from obtaining the password.

At step 430, as discussed above, the password entry UI control module 108 may instruct the password entry UI element 112 to display the password reveal selector 116 upon entry of the at least one character of the plurality of password characters 114. Although in the exemplary process 300, the password reveal selector 116 may be displayed upon entry of the at least one character of the plurality of password characters 114, in some embodiments, the password reveal selector 116 may be displayed prior to entry of any password characters.

At step 440, password entry UI control module 108 may detect a screen recording of the display 106.

At step 450, the password entry UI control module 108 may instruct the password entry UI element 112 to hide the password reveal selector 116 upon detection of the screen recording.

At step 460, optionally, the password entry UI element 112 may show the password reveal selector 116 if the screen recording is no longer detected.

Figure 6:
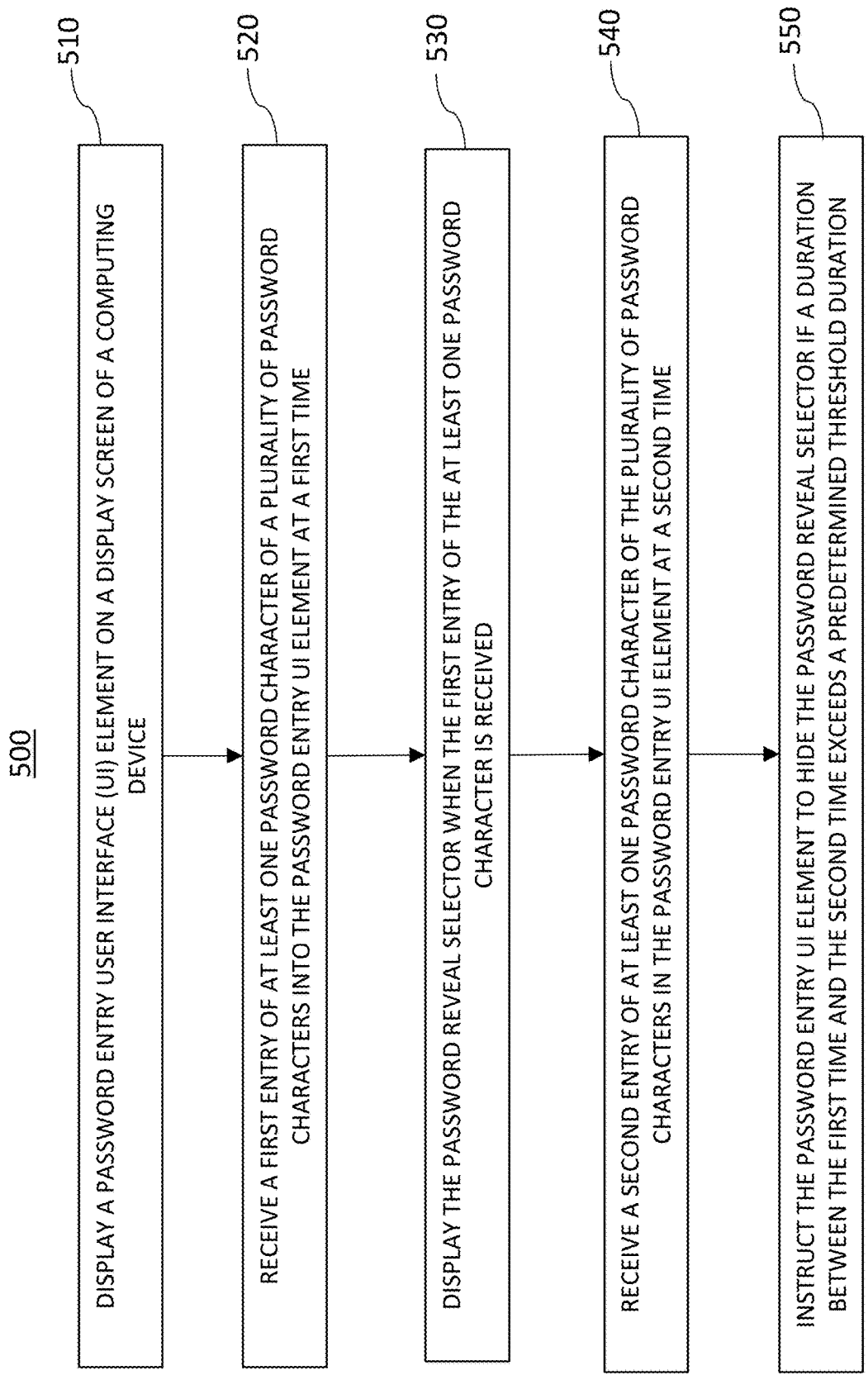
FIG. 6 is a process flow diagram illustrating an example of a computer-based process for hiding/showing a password reveal selector of a password entry user interface element, according to one or more embodiments of the present disclosure.

FIG. 6 is a process flow diagram illustration of an example of an illustrated computer-mediated process for hiding and/or displaying a password reveal selector, according to one or more embodiments of the present disclosure. The exemplary computer-mediated process 500 may be executed by software, hardware, or a combination thereof. For example, process 500 may be performed by including one or more components described in the system 100 of FIG. 1 (e.g., first computing device 102). The order in which the method steps are described are not intended to be construed as a limitation, and any number of the described method steps can be combined in any order to implement a method, or an alternate method.

At step 510, a password entry UI element 112 may be displayed for input of a plurality of password characters 114 of a password, the password entry UI element 112 including a password reveal selector 116 for user-selection to reveal the password. In some embodiments, any of the password entry boxes may be implemented to receive the plurality of password characters 114 by designation of a width parameter that indicates a minimum number of password characters for the password entry UI element 112. In some embodiments, the password reveal selector 116 may be hidden from view until entry of at least one character of the plurality of password characters 114 into the password entry UI element 112. For example, in some embodiments, the password entry UI element 112 may include the password reveal selector 116, which may be initially concealed from view when the password entry UI element 112 is displayed because a password character of the plurality of password characters 114 has not yet been received in the password entry UI element 112. In some embodiments, when at least one password character is received in the password entry UI element 112, the password reveal selector 116 may then be displayed for user-selection to initiate revealing the password.

At step 520, a first entry of at least one password character of the plurality of password characters 114 is entered into the password entry UI element 112. In some embodiments, the at least one character of the plurality of password characters 114 may be obfuscated when displayed in the password entry UI element 112. For example, in some embodiments, the computing device 102 receives the character entries for a password from any type of input device, such as a keyboard, mouse, on-screen keyboard, remote control device, game controller, or any other type of user-initiated and/or user-selectable input device. In some embodiments, the plurality of password characters 114 may be obfuscated to conceal the entries from view and preclude others from obtaining the password.

At step 530, as discussed above, the password entry UI control module 108 may instruct the password entry UI element 112 to display the password reveal selector 116 upon entry of the at least one character of the plurality of password characters 114. Although in the exemplary process 300, the password reveal selector 116 may be displayed upon entry of the at least one character of the plurality of password characters 114, in some embodiments, the password reveal selector 116 may be displayed prior to entry of any password characters.

At step 540, a second entry of at least one password character of the plurality of password characters 114 may be entered in the password entry UI element 112 at a second time.

At step 550, the password entry UI control module 108 may instruct the password entry UI element 112 to hide the password reveal selector 116 if a duration between the first time and the second time exceeds a predetermined threshold duration.

Figure 7:
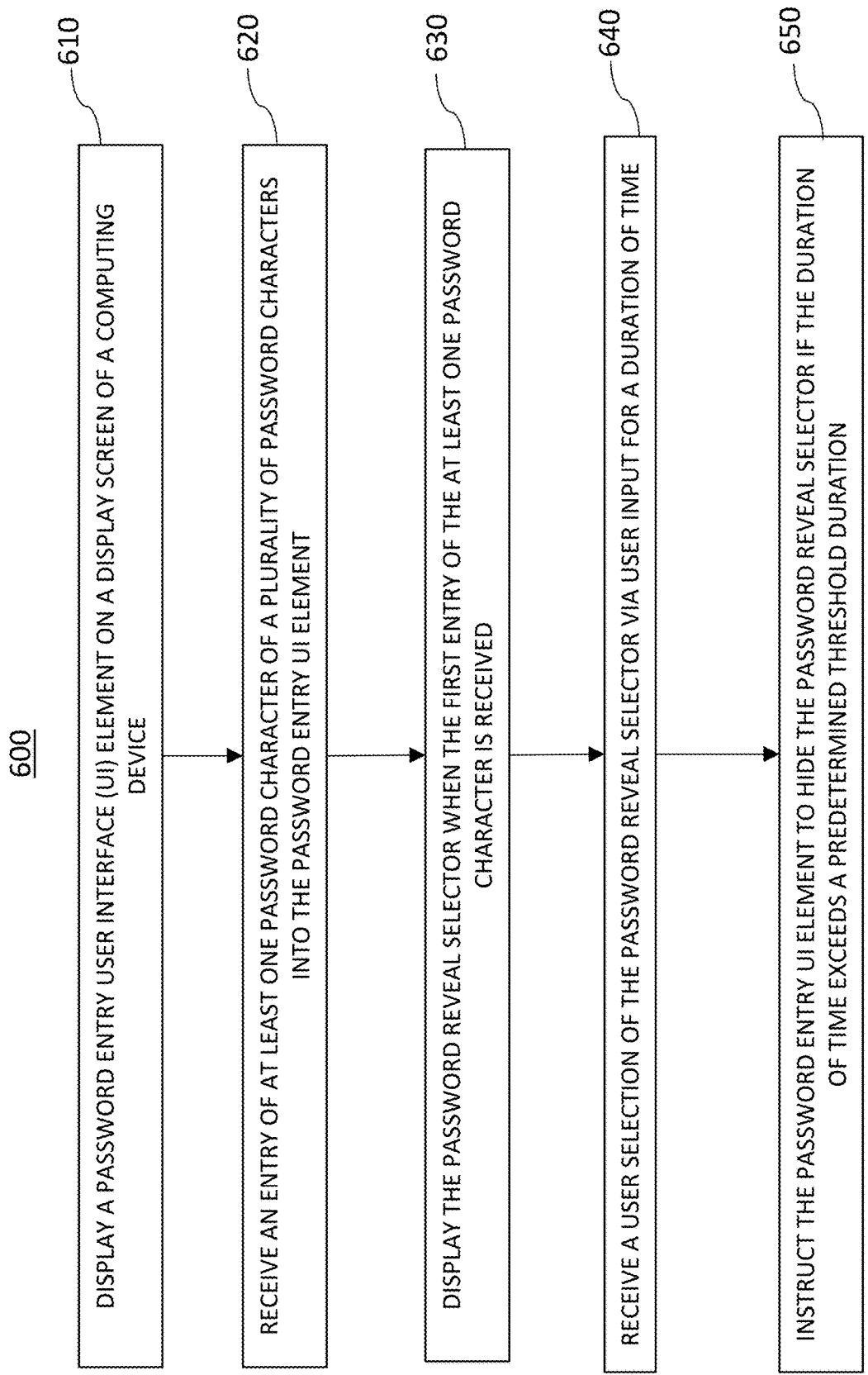
FIG. 7 is a process flow diagram illustrating an example of a computer-based process for hiding/showing a password reveal selector of a password entry user interface element, according to one or more embodiments of the present disclosure.

FIG. 7 is a process flow diagram illustration of an example of an illustrated computer-mediated process for hiding and/or displaying a password reveal selector, according to one or more embodiments of the present disclosure. The exemplary computer-mediated process 600 may be executed by software, hardware, or a combination thereof. For example, process 600 may be performed by including one or more components described in the system 100 of FIG. 1 (e.g., first computing device 102). The order in which the method steps are described are not intended to be construed as a limitation, and any number of the described method steps can be combined in any order to implement a method, or an alternate method.

At step 610, a password entry UI element 112 may be displayed for input of a plurality of password characters 114 of a password, the password entry UI element 112 including a password reveal selector 116 for user-selection to reveal the password. In some embodiments, any of the password entry boxes may be implemented to receive the plurality of password characters 114 by designation of a width parameter that indicates a minimum number of password characters for the password entry UI element 112. In some embodiments, the password reveal selector 116 may be hidden from view until entry of at least one character of the plurality of password characters 114 into the password entry UI element 112. For example, in some embodiments, the password entry UI element 112 may include the password reveal selector 116, which is initially concealed from view when the password entry UI element 112 is displayed because a password character of the plurality of password characters 114 has not yet been received in the password entry UI element 112. In some embodiments, when at least one password character is received in the password entry UI element 112, the password reveal selector 116 may then be displayed for user-selection to initiate revealing the password.

At step 620, at least one character of the plurality of password characters 114 may be entered into the password entry UI element 112. In some embodiments, the at least one character of the plurality of password characters 114 may be obfuscated when displayed in the password entry UI element 112. For example, in some embodiments, the computing device 102 may receive the character entries for a password from any type of input device, such as a keyboard, mouse, on-screen keyboard, remote control device, game controller, or any other type of user-initiated and/or user-selectable input device. In some embodiments, the plurality of password characters 114 may be obfuscated to conceal the entries from view and preclude others from obtaining the password.

At step 630, as discussed above, the password entry UI control module 108 may instruct the password entry UI element 112 to display the password reveal selector 116 upon entry of the at least one character of the plurality of password characters 114. Although in the exemplary process 300, the password reveal selector 116 may be displayed upon entry of the at least one character of the plurality of password characters 114, in some embodiments, the password reveal selector 116 may be displayed prior to entry of any password characters.

At step 640, a user selection of the password reveal selector may be received via a user input for a duration of time. For example, in some embodiments, the computing device 102 may receive the user input of the user selection from any type of input device, such as a keyboard, mouse, on-screen keyboard, remote control device, game controller, or any other type of user-initiated and/or user-selectable input device.

Figure 8:
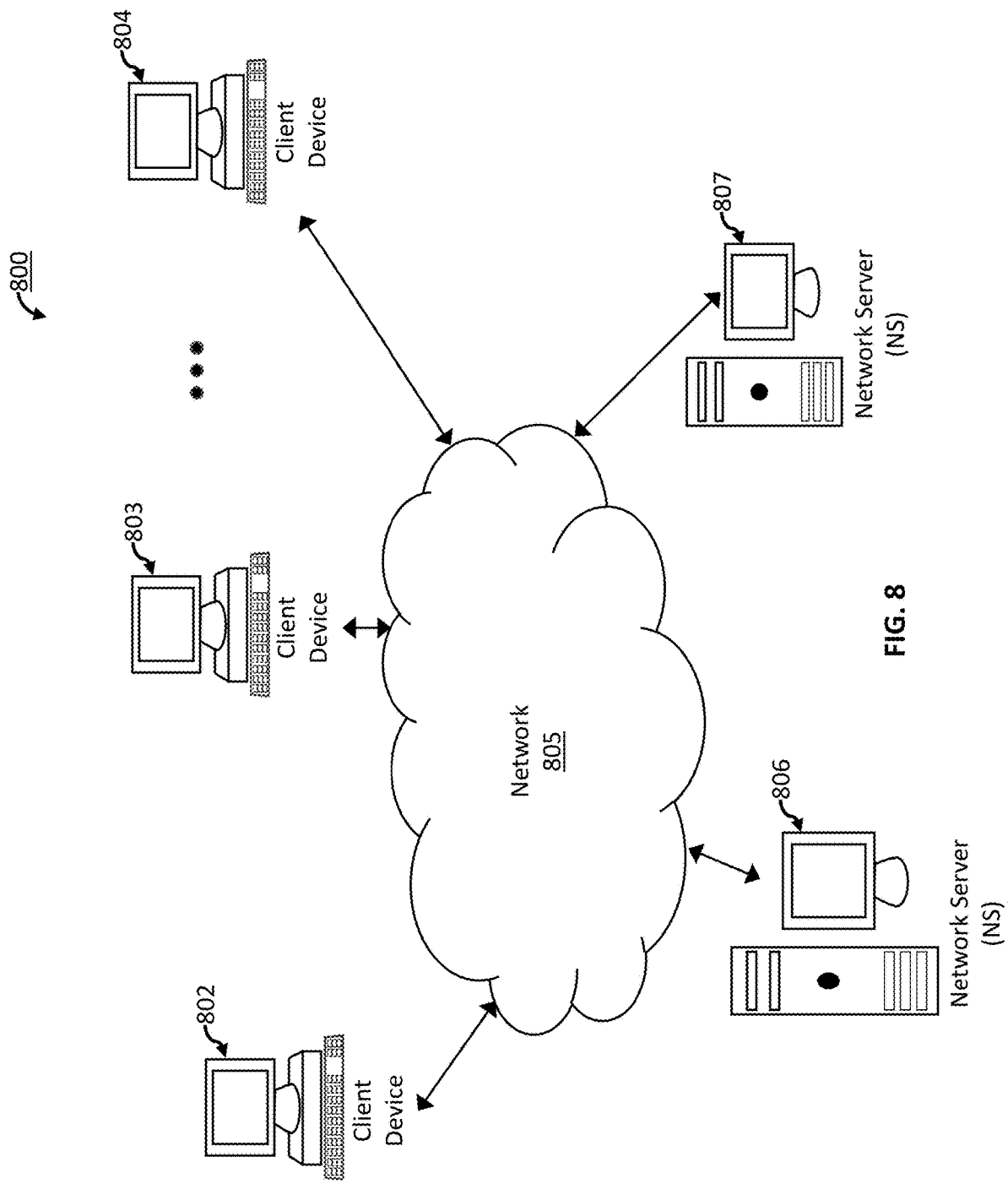
FIG. 8 is a block diagram illustrating an exemplary computer-based system and platform, according to one or more embodiments of the present disclosure.

At step 650, the password entry UI control module 108 may instruct the password entry UI element 112 to hide the password reveal selector 116 if the duration of time exceeds a predetermined threshold duration FIG. 8 depicts a block diagram of an exemplary computer-based system and platform 800 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 800 may be configured to manage a large number of members and concurrent transactions, as detailed herein. In some embodiments, the exemplary computer-based system and platform 800 may be based on a scalable computer and network architecture that incorporates various strategies for assessing the data, caching, searching, and/or database connection pooling. An example of the scalable architecture is an architecture that may be capable of operating multiple servers.

In some embodiments, referring to FIG. 8, member computing device 802, member computing device 803 through member computing device 804 (e.g., clients) of the exemplary computer-based system and platform 800 may include virtually any computing device capable of receiving and sending a message over a network (e.g., cloud network), such as network 805, to and from another computing device, such as servers 806 and 807, each other, and the like. In some embodiments, the member devices 802-804 may be personal computers, multiprocessor systems, microprocessor-based or programmable consumer electronics, network PCs, and the like. In some embodiments, one or more member devices within member devices 802-804 may include computing devices that typically connect using a wireless communications medium such as cell phones, smart phones, pagers, walkie talkies, radio frequency (RF) devices, infrared (IR) devices, CBs citizens band radio, integrated devices combining one or more of the preceding devices, or virtually any mobile computing device, and the like. In some embodiments, one or more member devices within member devices 802-804 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more member devices within member devices 802-804 may run one or more applications, such as Internet browsers, mobile applications, voice calls, video games, videoconferencing, and email, among others. In some embodiments, one or more member devices within member devices 802-804 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 802-804 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a member device may periodically report status or send alerts over text or email. In some embodiments, a member device may contain a data recorder which is remotely downloadable by the user using network protocols such as FTP, SSH, or other file transfer mechanisms. In some embodiments, a member device may provide several levels of user interface, for example, advanced user, standard user. In some embodiments, one or more member devices within member devices 802-804 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 805 may provide network access, data transport and/or other services to any computing device coupled to it. In some embodiments, the exemplary network 805 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 805 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 805 may include and implement, as an alternative or in conjunction with one or more of the above, a WiMAX architecture defined by the WiMAX forum. In some embodiments and, optionally, in combination of any embodiment described above or below, the exemplary network 805 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 805 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 805 may also include mass storage, such as network attached storage (NAS), a storage area network (SAN), a content delivery network (CDN) or other forms of computer or machine readable media.

In some embodiments, the exemplary server 806 or the exemplary server 807 may be a web server (or a series of servers) running a network operating system, examples of which may include but are not limited to Apache on Linux or Microsoft IIS (Internet Information Services). In some embodiments, the exemplary server 806 or the exemplary server 807 may be used for and/or provide cloud and/or network computing. Although not shown in FIG. 8, in some embodiments, the exemplary server 806 or the exemplary server 807 may have connections to external systems like email, SMS messaging, text messaging, ad content providers, etc. Any of the features of the exemplary server 806 may be also implemented in the exemplary server 807 and vice versa.

In some embodiments, one or more of the exemplary servers 806 and 807 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the member computing devices 801-804.

In some embodiments and, optionally, in combination of any embodiment described above or below, for example, one or more exemplary computing member devices 802-804, the exemplary server 806, and/or the exemplary server 807 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 9:
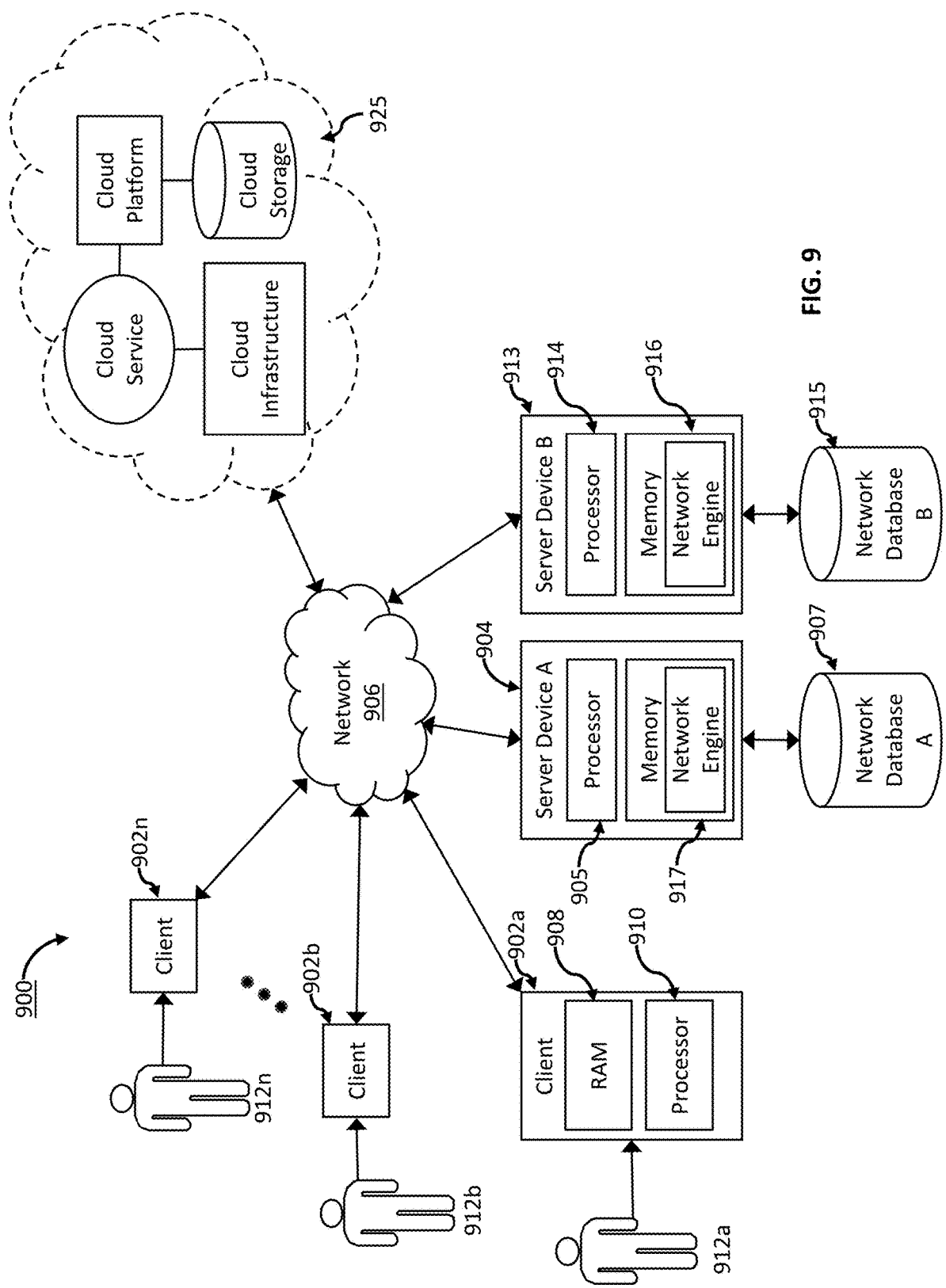
FIG. 9 is a block diagram illustrating another exemplary computer-based system and platform, according to one or more embodiments of the present disclosure.

FIG. 9 depicts a block diagram of another exemplary computer-based system and platform 900 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing device 902a, member computing device 902b through member computing device 902n shown each at least includes a computer-readable medium, such as a random-access memory (RAM) 908 coupled to a processor 910 or FLASH memory. In some embodiments, the processor 910 may execute computer-executable program instructions stored in memory 908. In some embodiments, the processor 910 may include a microprocessor, an ASIC, and/or a state machine. In some embodiments, the processor 910 may include, or may be in communication with, media, for example computer-readable media, which stores instructions that, when executed by the processor 910, may cause the processor 910 to perform one or more steps described herein. In some embodiments, examples of computer-readable media may include, but are not limited to, an electronic, optical, magnetic, or other storage or transmission device capable of providing a processor, such as the processor 910 of client 902a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may include code from any computer-programming language, including, for example, C, C++, Visual Basic, Java, Python, Perl, JavaScript, and etc.

In some embodiments, member computing devices 902a through 902n may also include a number of external or internal devices such as a mouse, a CD-ROM, DVD, a physical or virtual keyboard, a display, or other input or output devices. In some embodiments, examples of member computing devices 902a through 902n (e.g., clients) may be any type of processor-based platforms that are connected to a network 906 such as, without limitation, personal computers, digital assistants, personal digital assistants, smart phones, pagers, digital tablets, laptop computers, Internet appliances, and other processor-based devices. In some embodiments, member computing devices 902a through 902n may be specifically programmed with one or more application programs in accordance with one or more principles/methodologies detailed herein. In some embodiments, member computing devices 902a through 902n may operate on any operating system capable of supporting a browser or browser-enabled application, such as Microsoft™, Windows™, and/or Linux. In some embodiments, member computing devices 902a through 902n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 902a through 902n, user 912a, user 912b through user 912n, may communicate over the exemplary network 906 with each other and/or with other systems and/or devices coupled to the network 906. As shown in FIG. 9, exemplary server devices 904 and 913 may include processor 905 and processor 914, respectively, as well as memory 917 and memory 916, respectively. In some embodiments, the server devices 904 and 913 may be also coupled to the network 906. In some embodiments, one or more member computing devices 902a through 902n may be mobile clients.

In some embodiments, at least one database of exemplary databases 907 and 915 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 10:
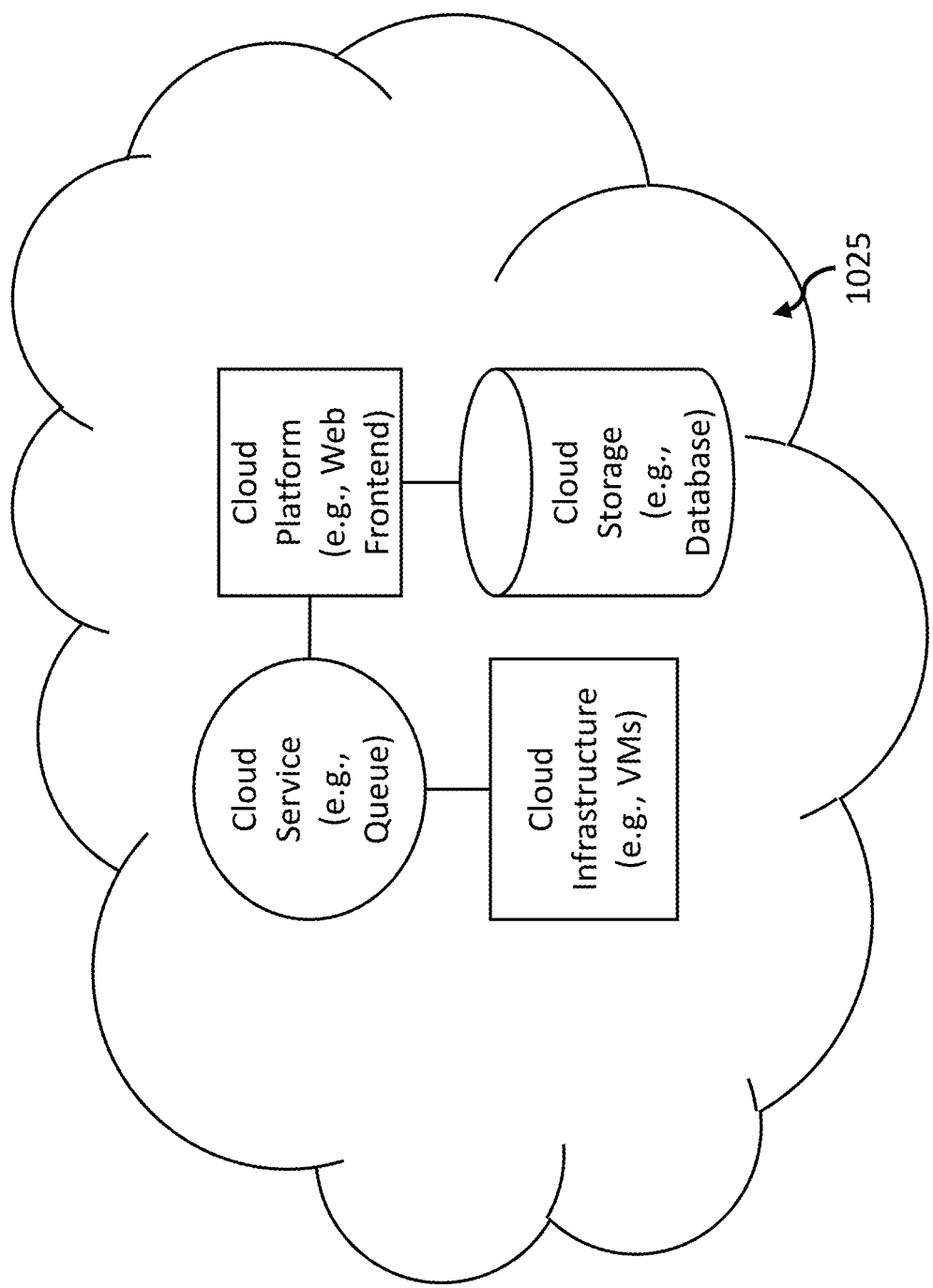
FIG. 10 is a schematic illustration of an exemplary implementation of a cloud computing/architecture(s) in which the exemplary inventive computer-based system and platform of the present disclosure may be specifically configured to operate, according to one or more embodiments of the present disclosure.
Figure 11:
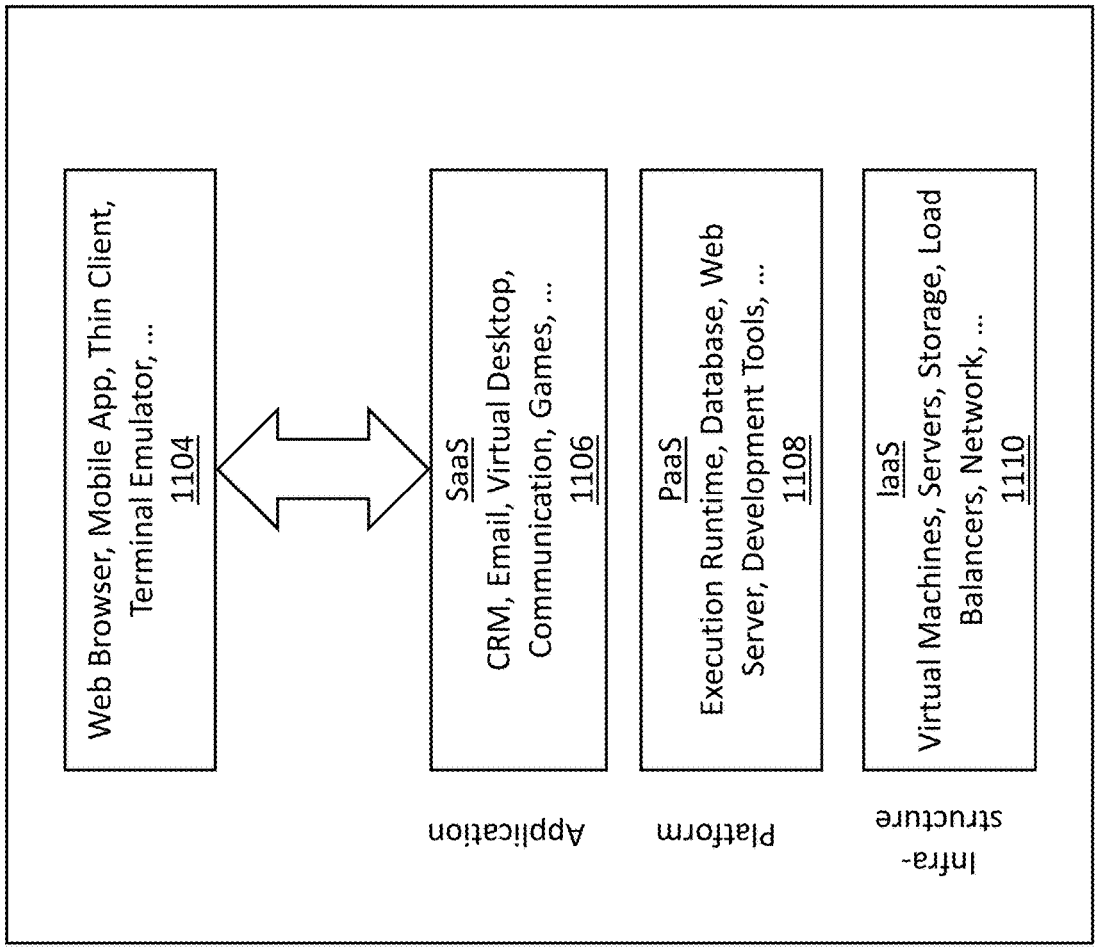
FIG. 11 is another schematic illustration of an exemplary implementation of a cloud computing/architecture(s) in which the exemplary inventive computer-based system and platform of the present disclosure may be specifically configured to operate, according to one or more embodiments of the present disclosure.

In some embodiments, the exemplary inventive computer-based systems/platforms, the exemplary inventive computer-based devices, and/or the exemplary inventive computer-based components of the present disclosure may be specifically configured to operate in a cloud computing/architecture 925 such as, but not limiting to: infrastructure a service (IaaS) 1110, platform as a service (PaaS) 1108, and/or software as a service (SaaS) 1106 using a web browser, mobile app, thin client, terminal emulator or other endpoint 1104. FIGS. 10 and 11 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of a software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) are within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) Open VMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

At least some aspects of the present disclosure will now be described with reference to the following numbered clauses.

1. A computer-implemented method including:
   instructing, by one or more processors, a display screen of a computing device to display a password entry user interface (UI) element configured for input of a plurality of password characters of a password,
      where the password entry UI element includes a user-selectable password reveal selector,
         where the password reveal selector is operable to be toggled between a first state in which the plurality of password characters are obfuscated and a second state in which the plurality of password characters are revealed;
   receiving, by one or more processors, an entry of at least one password character of the plurality of password characters in the password entry UI element,
      where the entry of the at least one password character of the plurality of password characters is obfuscated while displayed in the password entry UI element;
   instructing, by the one or more processors, the password entry UI element to display the password reveal selector;
   detecting, by the one or more processors, a speed at which each character of the at least one password character of the plurality of password characters is entered into the password entry UI element;
   instructing, by the one or more processors, the password entry UI element to hide the password reveal selector if a total speed at which each character the at least one password character of the plurality of password characters is entered is less than a predetermined threshold speed.

2. The method of clause 1, further including:
   instructing, by the one or more processors, the password entry UI element to show the password reveal selector if each character of the at least one password character is deleted from the password entry UI element.

3. The method of clause 1, where the predetermined threshold speed is from one character per 0.05 seconds to one character per 0.5 seconds.

4. The method of clause 1, where the password reveal selector is instructed to be displayed after the at least one password character of the plurality of password characters is received in the password entry UI element.

5. The method of clause 1, where the password reveal selector is instructed to transition from the first state to the second state upon a user selection of the password reveal selector.

6. The method of clause 5, where the password reveal selector is configured to remain in the second state until a user selection is removed from the password reveal selector.

7. The method of clause 1, where the password entry UI element is a password text box.

8. A computer-implemented method including:
   instructing, by one or more processors, a display screen of a computing device to display a password entry user interface (UI) element configured for input of a plurality of password characters of a password,
where the password entry UI element includes a user-selectable password reveal selector,
where the password reveal selector is operable to be toggled between a first state in which the plurality of password characters are obfuscated and a second state in which the plurality of password characters are revealed;
receiving, by one or more processors, an entry of at least one password character of the plurality of password characters in the password entry UI element,
where the entry of the at least one password character of the plurality of password characters is obfuscated while displayed in the password entry UI element;
instructing, by the one or more processors, the password entry UI element to display the password reveal selector;
detecting, by the one or more processors, a time at which each character of the at least one password character of the plurality of password characters is entered into the password entry UI element;
instructing, by the one or more processors, the password entry UI element to hide the password reveal selector if a duration between a first time at which a first character of the at least one password character of the plurality of password characters and a second time at which a last character of the at least one password character of the plurality of password characters is less than a predetermined threshold duration.

9. The method of clause 8, further including:
instructing, by the one or more processors, the password entry UI element to show the password reveal selector if each character of the at least one password character is deleted from the password entry UI element.

10. The method of clause 8, where the predetermined threshold duration is from 0.05 seconds to 0.5 seconds.

11. The method of clause 8, where the password reveal selector is instructed to be displayed after the at least one password character of the plurality of password characters is received in the password entry UI element.

12. The method of clause 8, where the predetermined threshold duration is based on a password length requirement.

13. The method of clause 8, where the password reveal selector is instructed to transition from the first state to the second state upon a user selection of the password reveal selector.

14. The method of clause 13, where the password reveal selector is configured to remain in the second state until a user selection is removed from the password reveal selector.

15. A computer-implemented method including:
instructing, by one or more processors, a display screen of a computing device to display a password entry user interface (UI) element configured for input of a plurality of password characters of a password,
where the password entry UI element includes a user-selectable password reveal selector,
where the password reveal selector is operable to be toggled between a first state in which the plurality of password characters are obfuscated and a second state in which the plurality of password characters are revealed;
receiving, by one or more processors, an entry of at least one password character of the plurality of password characters in the password entry UI element,
where the entry of the at least one password character of the plurality of password characters is obfuscated while displayed in the password entry UI element;
instructing, by the one or more processors, the password entry UI element to display the password reveal selector;
detecting, by the one or more processors, a screen recording of the display screen;
instructing, by the one or more processors, the password entry UI element to hide the password reveal selector upon detection of the screen recording.

16. The method of claim 15, further including:
instructing, by the one or more processors, the password entry UI element to show the password reveal selector if the screen recording is no longer detected.

17. The method of claim 15, where the password reveal selector is instructed to be displayed after the at least one password character of the plurality of password characters is received in the password entry UI element.

18. The method of claim 15, where the password reveal selector is instructed to transition from the first state to the second state upon a user selection of the password reveal selector 19. The method of claim 18, where the password reveal selector is configured to remain in the second state until a user selection is removed from the password reveal selector.

20. The method of claim 15, where the password entry UI element is a password text box.

Publications cited throughout this document are hereby incorporated by reference in their entirety. While one or more embodiments of the present disclosure have been described, it may be understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed:
1. A method, comprising:
instructing, by one or more processors, a display screen of a computing device to display a password entry user interface (UI) element configured for input of a plurality of password characters of a password,
wherein the password entry UI element comprises a user-selectable password reveal selector,
wherein the password reveal selector is operable to be toggled between a first state in which the plurality of password characters are obfuscated and a second state in which the plurality of password characters are revealed;
receiving, by the one or more processors, an entry of at least one password character of the plurality of password characters in the password entry UI element,
wherein the entry of the at least one password character of the plurality of password characters is obfuscated while displayed in the password entry UI element;
instructing, by the one or more processors, the password entry UI element to display the password reveal selector;
detecting, by the one or more processors, a speed at which each character of the at least one password character of the plurality of password characters is entered into the password entry UI element;

instructing, by the one or more processors, the password entry UI element to hide the password reveal selector if a total speed at which each character the at least one password character of the plurality of password characters is entered is less than a predetermined threshold speed;

detecting, by the one or more processors, a clipboard paste event in the password entry UI element; and instructing, by the one or more processors, the password entry UI element to hide the password reveal selector upon detection of the clipboard paste event.

2. The method of claim 1, further comprising:
instructing, by the one or more processors, the password entry UI element to show the password reveal selector if each character of the at least one password character is deleted from the password entry UI element.

3. The method of claim 1, wherein the predetermined threshold speed is from one character per 0.05 seconds to one character per 0.5 seconds.

4. The method of claim 1, wherein the password reveal selector is instructed to be displayed after the at least one password character of the plurality of password characters is received in the password entry UI element.

5. The method of claim 1, wherein the password reveal selector is instructed to transition from the first state to the second state upon a user selection of the password reveal selector.

6. The method of claim 5, wherein the password reveal selector is configured to remain in the second state until a user selection is removed from the password reveal selector.

7. The method of claim 1, wherein the password entry UI element is a password text box.

8. A method, comprising:
instructing, by one or more processors, a display screen of a computing device to display a password entry user interface (UI) element configured for input of a plurality of password characters of a password,
wherein the password entry UI element comprises a user-selectable password reveal selector,
wherein the password reveal selector is operable to be toggled between a first state in which the plurality of password characters are obfuscated and a second state in which the plurality of password characters are revealed;
receiving, by the one or more processors, an entry of at least one password character of the plurality of password characters in the password entry UI element,
wherein the entry of the at least one password character of the plurality of password characters is obfuscated while displayed in the password entry UI element;
instructing, by the one or more processors, the password entry UI element to display the password reveal selector;
detecting, by the one or more processors, a time at which each character of the at least one password character of the plurality of password characters is entered into the password entry UI element;
instructing, by the one or more processors, the password entry UI element to hide the password reveal selector if a duration between a first time at which a first character of the at least one password character of the plurality of password characters and a second time at which a last character of the at least one password character of the plurality of password characters is less than a predetermined threshold duration;
detecting, by the one or more processors, a clipboard paste event in the password entry UI element; and instructing, by the one or more processors, the password entry UI element to hide the password reveal selector upon detection of the clipboard paste event.

9. The method of claim 8, further comprising:
instructing, by the one or more processors, the password entry UI element to show the password reveal selector if each character of the at least one password character is deleted from the password entry UI element.

10. The method of claim 8, wherein the predetermined threshold duration is from 0.05 seconds to 0.5 seconds.

11. The method of claim 8, wherein the password reveal selector is instructed to be displayed after the at least one password character of the plurality of password characters is received in the password entry UI element.

12. The method of claim 8, wherein the predetermined threshold duration is based on a password length requirement.

13. The method of claim 8, wherein the password reveal selector is instructed to transition from the first state to the second state upon a user selection of the password reveal selector.

14. The method of claim 13, wherein the password reveal selector is configured to remain in the second state until a user selection is removed from the password reveal selector.

15. A method, comprising:
instructing, by one or more processors, a display screen of a computing device to display a password entry user interface (UI) element configured for input of a plurality of password characters of a password,
wherein the password entry UI element comprises a user-selectable password reveal selector,
wherein the password reveal selector is operable to be toggled between a first state in which the plurality of password characters are obfuscated and a second state in which the plurality of password characters are revealed;
receiving, by the one or more processors, an entry of at least one password character of the plurality of password characters in the password entry UI element,
wherein the entry of the at least one password character of the plurality of password characters is obfuscated while displayed in the password entry UI element;
instructing, by the one or more processors, the password entry UI element to display the password reveal selector;
detecting, by the one or more processors, a screen recording of the display screen;
instructing, by the one or more processors, the password entry UI element to hide the password reveal selector upon detection of the screen recording;
detecting, by the one or more processors, a clipboard paste event in the password entry UI element; and
instructing, by the one or more processors, the password entry UI element to hide the password reveal selector upon detection of the clipboard paste event.

16. The method of claim 15, further comprising:
instructing, by the one or more processors, the password entry UI element to show the password reveal selector if the screen recording is no longer detected.

17. The method of claim 15, wherein the password reveal selector is instructed to be displayed after the at least one password character of the plurality of password characters is received in the password entry UI element.

18. The method of claim 15, wherein the password reveal selector is instructed to transition from the first state to the second state upon a user selection of the password reveal selector.

19. The method of claim 18, wherein the password reveal selector is configured to remain in the second state until a user selection is removed from the password reveal selector.

20. The method of claim 15, wherein the password entry UI element is a password text box.

\* \* \* \* \*